United States Patent Office 3,429,136
Patented Feb. 25, 1969

3,429,136
PROCESS FOR PREPARING HYDROXY-
SULFONATE ESTERS
Ernest Knowlton Holt, Tenafly, N.J., Herbert H. Mueller,
Riverside, Conn., and Warren J. Urban, Teaneck, N.J.,
assignors to Lever Brothers Company, New York, N.Y.,
a corporation of Maine
Filed Dec. 11, 1964, Ser. No. 417,577
U.S. Cl. 62—114                                 6 Claims
Int. Cl. C11d 1/14; C07c 143/90

ABSTRACT OF THE DISCLOSURE

This application discloses a novel method for the manufacture of esters of hydroxy sulfonates for use as detergents. Hot hydroxy sulfonate esters are cooled from temperatures in the order of 350° to 500° F., which are encountered in the preparation of such compounds, to a temperature below about 330° F., at which temperature the ester products may be safely exposed to the atmosphere, by injecting into the hot molten ester mass from 1 to 50 pounds of water per pound of ester. Cooling is sufficiently rapid that no detectable amounts of hydrolysis occurs.

---

Figure 1:
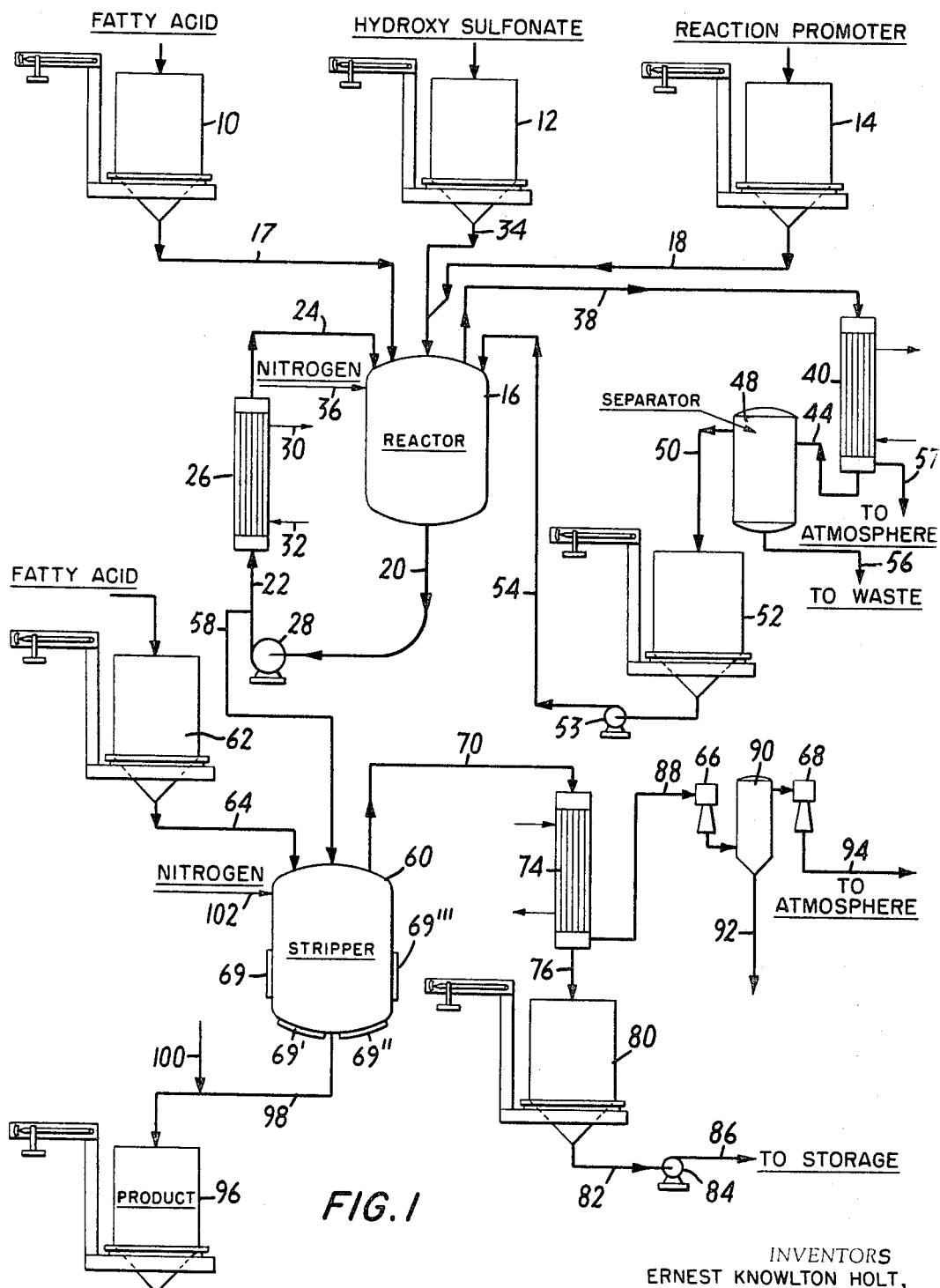

The present invention relates to the preparation of surface-active agents. More particularly, it relates to a process for preparing surface-active agents of the general formula $RCOOR'SO_3M$, where R is a monovalent aliphatic hydrocarbon radical having from 5 to 19 carbon atoms, R' is selected from the group consisting of divalent aliphatic hydrocarbon radicals containing 2 to 4 carbon atoms and aryl and alkyl-aryl radicals containing 6 to 8 carbon atoms, and M is an alkali metal, particularly sodium or potassium.

Compounds of the foregoing description may be synthesized from an organic acid of the formula RCOOH and a hydroxy-sulfonate of the formula $HOR'SO_3M$. The organic acids which are suitable for the manufacture of surface-active agents may be used. In general, these are mixtures of the acids of aliphatic hydrocarbons having 8 to 20 carbon atoms. Such acids include the unsubstituted, saturated or unsaturated, straight-chain fatty acids, such as lauric acid, myristic acid, acids derived from palm kernel oil, acids derived from coconut oil, acids derived from babassu oil and acids derived from ouri curi oil. Synthetic acids may also be used, such acids being obtained from petroleum fractions such as the Oxo and Koch process or by the polymerization of alpha olefins. In the present invention, aliphatic acids of the foregoing types should be employed as mixtures, and the mixture should contain a major portion of fatty acids containing about 14 carbon atoms or less.

As the hydroxy-sulfonate it is preferred to use a compound in which R' is a divalent hydrocarbon radical containing 2 to 4 carbon atoms, particularly ethylene methylethylene, dimethylethylene, propylene or butylene. R' may also be an aryl or alkyl-aryl group containing from 6 to 8 carbon atoms. M is preferably an alkali metal, especially sodium or potassium. The second reactant may be conveniently prepared by the reaction of an epoxide, for example ethylene oxide, propylene oxide, butylene oxide or styrene oxide, with sodium bisulfite. Examples of compounds suitable for use as the second reactant are sodium isethionate, potassium methyl isethionate, sodium dimethyl isethionate, sodium 3-hydroxy-propane-sulfonate, and potassium benzyl isethionate.

In order to achieve a high utilization of the hydroxy-sulfonate, the reaction is normally carried out using an excess of the acid reactant. In general, at least 1.2 moles of acid per mole of hydroxy-sulfonate are employed, and the amount of excess acid may exceed 2 moles per mole, although in commercially practical processes mole ratios above this value are neither necessary nor preferred. The excess acid, in addition to producing a high utilization of the hydroxy-sulfonate, assists in maintaining the product in liquid form during the reaction and in reducing formation of foam.

The direct esterification reaction between these materials is known to be a difficult reaction. Partially to overcome the difficulty of the reaction, reaction promoters may be provided to achieve acceptable conversion levels.

In the presence of such reaction promoters, the reaction may be satisfactorily carried out at temperatures of 390°–465° F. In the absence of such promoters, higher temperatures, such as up to about 500° F., are usually necessary to avoid premature cessation of the reaction.

In carrying out commercially practical processes for the foregoing reaction, complete reaction is not normally obtained. The reaction product will, therefore, contain unreacted fatty acids. Because the fatty acids of lower molecular weight, and most especially the free fatty acids having less than about 12 carbon atoms, are undesirable in many detergent products, it may be desired to remove at least a portion of these fatty acids.

This is accomplished by subjecting the reaction mass to stripping conditions. In general, if the mass is maintained at a temperature between about 400° and 500° F. and subjected to a vacuum, the undesired lower molecular weight fatty acids can be removed.

For a further understanding of the foregoing reaction, and the process by which it is effected, reference may be had to the application of Messrs. Holland, McCrimlisk and Kelly, Ser. No. 417,589, filed Dec. 11, 1964.

Whether the reaction product is used without further purification or only after stripping, there results a mass containing a major proportion of isethionate esters at a temperature of 350° to 500° F. At these temperatures, the ester-containing mass is quite sensitive to oxidation by air. Thus, if it were simply exposed to air and allowed to cool, the resulting product would be seriously discolored.

Discoloration can be avoided by carrying out the cooling in closed equipment and providing for an inert atmosphere. However, because of the high viscosity of the reaction product, which increases as the product cools, equipment for mechanically cooling the reaction product is cumbersome and expensive.

According to the present invention, it has been found that the ester-containing mass can be conveniently cooled by mixing it with an amount of water, generally in excess of 1 lb. per 50 pounds of product, sufficient to cool the ester-containing mass to a temperature between about the boiling point of water and 330° F. The process of this invention, thereby permits one to obtain a batch of acyl isethionate esters cooled to a temperature sufficiently low that charring or discoloration of the product does not occur. So long as the temperature to which the product is cooled is above the boiling point of water (at the prevailing pressure) most of the injected water will vaporize. Accordingly, this process will not result in excessively wet ester products.

In addition to providing the necessary cooling, the flash-cooling process of the present invention provides a still further advantage. In conventional processing, the hydroxysulfonate esters are preferably deodorized to remove trace amounts of odors and to provide thereby the best quality product. It has been found that the flash-cooling process of this invention is effective to provide the requisite deodorization, thereby obviating the need for a separate deodorizing step.

The process of this invention is of particular utility when taken in combination with the process mentioned above for the formation of hydroxy sulfonate esters by direct esterification. However, the invention is not necessarily so limited. When taken in combination with the direct esterification process, the present invention may be conveniently practiced by injecting water as it is transferred (through a pipe or like conveying means) from the final step of the process. When taken in this combination, mixing can be conveniently provided by means of appropriate in-line mixing devices adapted to continuously mix the combined streams of hydroxy sulfonate esters and water as they leave the last step of the process.

The fact that water can be successfully used in the present invention is most surprising. While in other situations it is known to cool various materials by injecting volatile liquids therein and permitting the injected liquid to volatilize, the problem of cooling hydroxy-sulfonate esters from temperatures between about 350° and 500° F. presents some special problems.

Firstly, a number of materials are necessarily excluded because they would present serious fire hazards. In this category, one may mention the volatile hydrocarbons or organic solvents (such as alcohols). Still other large groups of liquids which might be used must be avoided for the reason that they would interfere with the end use of the ester-containing mass in detergent bars. Among such solvents which would interfere, for reasons of odor or otherwise, would be the chlorinated hydrocarbon solvents such as ethylene dichloride. Still other liquids which might be used are rendered impractical because of the high cost and expense thereof. The halogenated refrigerants (known under the trademark Freons) are exemplary of this group.

From the foregoing considerations, it can be demonstrated that only water of all potential liquids is a practical liquid to use in the flash-cooling of ester-containing masses. Water, however, is not without serious drawbacks. This is because water will readily hydrolyze the hydroxy sulfonate esters. Indeed, it is to prevent hydrolysis (i.e. the reverse of the esterification reaction) during the principal esterification reaction that the reaction is carried out under such conditions as to remove the water of reaction as it is formed. Since the flash-cooling process would necessarily involve injection of water into the ester-containing mass while it is still at reaction conditions, it would appear that water also would be unsatisfactory as a coolant for the reason that the hydroxy sulfonate ester would be liable to hydrolysis by the cooling water. Quite surprisingly, it has been found that in the practice of the present invention no detectable hydrolysis of the hydroxy sulfonate esters occurs.

For a further understanding of the present invention and of the process to which it is applicable, reference may be had to the attached figures in which FIGURE 1 represents a simplified flow diagram for the synthesis of hydroxy-sulfonate esters in which the flash-cooling step has particular utility; and FIGURES 2 through 5 represent various embodiments of an in-line mixing device appropriate for use in the practice of the present invention.

As already mentioned, the flash-cooling process of the present invention has particular utility when taken in combination with a process for the synthesis of hydroxy sulfonate esters by direct esterification. Referring to FIGURE 1, the direct esterification process may be carried out as follows:

The quantity of aliphatic acids to be employed in a batch, normally in excess of the stoichiometrically required amount, is measured in a scale tank 10. Simultaneously, the amount of hydroxy sulfonate reactant is measured in scale tank 12. As mentioned, the weight ratio of fatty acids to hydroxy sulfonates in the charge is at least about 1.2:1. A slurry of the reaction promoter is prepared and stored in vessel 14. The amount of reaction promoter will generally be about 0.05% to 2% by weight of the reaction mass. Normally, the amount of reaction promoter is sufficiently small in volume that a scale tank need not be provided and, in fact, the reaction promoter slurry may be conveniently prepared in a suitable pail.

The temperature of the reactants in scale tanks 10 and 12 is not important although from the standpoint of heat economy they should be as warm as possible. Typically, the temperature of the reactants will be in the order of 100° F.–250° F., but below the boiling point of the reactants.

In carrying out the process, the fatty acids are charged into reactor 16 from scale tank 10 via pipe 17 and thereafter the reaction promoter slurry which had been prepared is added via pipe 18. After the addition of the acid reactant and reaction promoter, reactor 16 is closed. The materials therein are circulated through pipes 20, 22 and 24 forming a recirculation loop containing heat exchanger 26. A pump 28 is provided to circulate the materials through the recirculation loop. A heating medium is supplied at a low rate to heat exchanger 26 (through pipes 30 and 32 leading respectively to and from a heater or steam generator, not shown).

After the circulation through the recirculation loop has been started, the hydroxy sulfonate reactant is charged into the reactor 16 from its scale tank 12 via pipe 34. The heating is continued for about an hour during which time free water associated with the hydroxy sulfonate is distilled and the entire mass is heated to a temperature of at least about 400° F.

It has been found through experience that the hot reaction mass is sensitive to oxidation by air. For this reason, care must be taken to avoid the presence of air in the reactor after the reactants have been charged. For this purpose a nitrogen purge is provided in the vapor space of the reactor by pipe 36 at a rate sufficient to sweep away the undesired air. For most favorable results, nitrogen which is substantially free of oxygen, i.e. containing less than about 10 p.p.m. of oxygen, is employed for this purpose. The nitrogen purge is admitted through pipe 36 immediately upon closing the reactor and before the reaction mass has been heated.

Water associated with the concentrated hydroxy sulfonate charge is driven off during the initial heating and leaves via pipe 38 together with the nitrogen purge. The water is condensed in condenser 40 and the condensate flows through pipe 44 to a water separator 48. Any fatty acids which have co-distilled with the water are separated in the separator 48 and accumulated via pipe 50 in scale tank 52. Acids from scale tank 52 are pumped by pump 53 and pipe 54 back to reactor 16 at a rate sufficient to maintain a constant liquid level in the reactor. Water from the separator 48 is discharged to the drain 56. Uncondensed vapors and nitrogen leave the condenser 40 via pipe 57.

After the reaction mass has been brought to a temperature of about 430°–480° F., the reaction is continued at this temperature for a period of about 60 to 150 minutes. During this time the direct esterification of the hydroxy sulfonate is carried as far as practical, the conversion of the hydroxy sulfonate in the reactor normally being about 75%–85%. During the continuance of the reaction, additional water formed as a by-product of the reaction is evolved and condensed in condenser 40 together with additional amounts of fatty acids which had been vaporized. This condensate also is collected in separator 48, the water being discharged to the drain and the fatty acid recovered being accumulated in scale tank 52. Recycle of the accumulated fatty acids is continued for the entire reaction period.

After the time allowed for the reaction has elapsed, the contents of reactor 16 are discharged via pipes 20 and 58 to a vacuum stripper 60. The stripper 60 is then partially evacuated by means of jet evacuators 66 and 68 and the vapors leaving the reactor through pipe 70 are condensed in condenser 74. After about 15 to 45 minutes, a quantity of a higher molecular weight fatty acid is added to the stripper 60 from a scale tank 62 via pipe 64. Generally, about 10 lbs. to 50 lbs. of higher fatty acid should be provided for each 100 lbs. of reaction mass. This acid is added to maintain the mass in a more fluid state while the excess lower molecular weight fatty acids remaining after the completion of the reaction are stripped. Greater amounts of fatty acid may be used for maintaining the fluidity of the mass during stripping, however, they are unnecessary, and because excessive amounts would have to be removed in any event, it is preferred not to do so.

Following the addition of the higher fatty acid, the vacuum is increased to as high a level as is obtainable. During stripping, the temperature is maintained at about 400°–500° F. by means of steam jacket 69–69'''. The condensate recovered by stripping, consisting largely of unreacted lower molecular weight fatty acids, is collected via pipe 76 in a scale tank 80. From scale tank 80 it is pumped via pipe 82, pump 84 and pipe 86 to a storage tank (not shown) and held for use in subsequent batches.

Uncondensed vapors and nitrogen leave the condenser 74 via pipe 88 and are exhausted to the atmosphere via the two-stage jet evacuator 66 and 68. As illustrated, a condenser 90 and a barometric leg 92 are provided intermediate the two-stages 66 and 68. Pipe 94 from the second stage 68 discharges to the atmosphere.

After a sufficient amount of condensate has been removed to purify the hydroxy sulfonate ester to the extent desired, the vacuum in stripper 60 is released and the entire mass therein is discharged to a holding tank 96 via pipe 98. Water is injected into pipe 98 at pipe 100 to flash cool the purified hydroxy sulfonate ester.

Prior to the flash-cooling step, it is necessary to maintain the temperature of the hot mass at least above about 350° F., since below that temperature the reaction product freezes to a solid mass. Because the contents of the stripper are, therefore, at an elevated temperature, it is necessary to maintain a slight nitrogen purge therethrough. For this purpose, nitrogen is admitted to stripper 60 via pipe 102. Analogous to the nitrogen purge in reactor 16, the nitrogen purge in stripper 60 is preferably substantially free of molecular oxygen.

The flash-cooling process, as mentioned immediately above, is generally applicable to the cooling masses containing a substantial amount of hydroxy sulfonate esters from temperatures between about 350° F. and 500° F. The above described process illustrates but one method by which ester-containing masses to which the present invention is applicable may be prepared. As already mentioned, the ester-containing mass may or may not be subjected to stripping, depending upon the purity of the crude reaction product and the end use to which it is to be applied. Moreover, the ester-containing mass may be hot blended with one or more components of the formulation in which the acyl hydroxy-sulfonate ester is employed. Accordingly, there may be as little as 25% acyl hydroxy-sulfonate ester in the ester-containing mass, or there may be as much as about 75% to 85% ester, depending on the manner in which the ester-containing mass has been processed.

The amount of water employed relative to the amount of ester-containing mass to be cooled will, obviously, depend upon the temperature from which it is cooled. In general, at least about 1 lb. of water will be required for each 50 lbs. of ester-containing mass.

In the simplest embodiment of the present invention, the water may be injected into the hot ester-containing mass. However, much better results are obtained if some mixing means are provided to intersperse the ester-containing mass with the injected water. The advantages for employing mixing are two-fold. Firstly, thoroughly mixing the water and the hot ester-containing mass minimizes the amount of cooling water which is required. In the absence of mixing, the injected water may accumulate in pockets or slugs which do not provide efficient thermal contact between the injected water and the hot ester-containing mass. Therefore, to cool all of the ester-containing mass thoroughly, it is necessary to use larger amounts of water if adequate mixing is not provided.

Secondly, it is generally desired that the hydroxy sulfonate ester product should not contain large amounts of excess water. Preferably, the water content of the product should be no more than about 4% or 5%. If the water is not thoroughly mixed with the ester-containing mass and, therefore, accumulates in pockets or slugs which do not evaporate, the water content of the ester product may be increased more than it is preferred.

While, as just indicated, the present invention may be carried out batchwise, it is much preferred in commercially practical processes to employ semi-continuous techniques adapted to receive the ester-containing mass from the esterification process, and cool it while it is being transferred from the last step of the process. Typically, this may be conveniently carried out by injecting cooling water into the pipe by which the ester-containing mass is discharged from the terminal vessel of the processing equipment.

Figure 2:
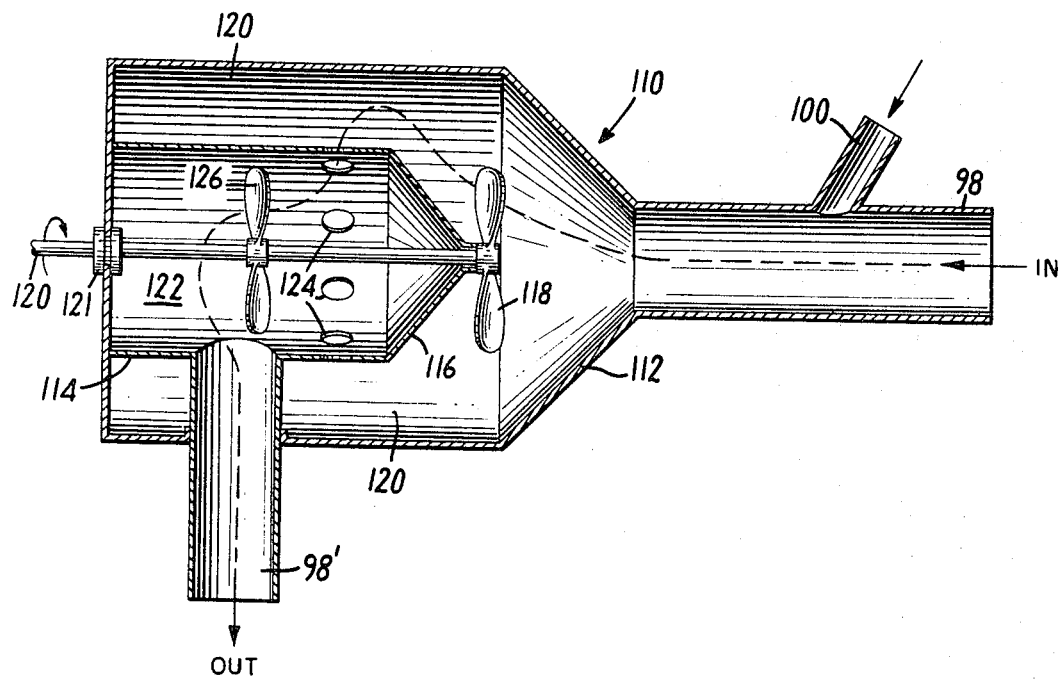
Figure 3:
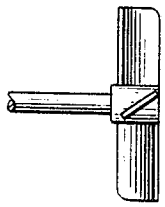
Figure 4:
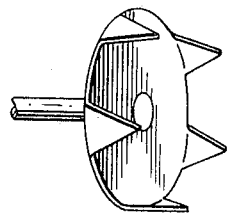

Mixing devices appropriate for use in such a semi-continuous process are generally the in-line mixers, i.e. a mixer adapted to function within the pipe transferring the ester-containing mass from the stripper (or reaction vessel) to the product storage tank. A typical in-line mixer suitable for the practice of the invention is shown in FIGURES 2 through 5. As shown in FIGURE 2, the hot ester-containing mass is pumped through pipe 98, past pipe 100 through which cold cooling water is injected. The combined streams of ester-containing mass and water then enter the mixer 110 which is comprised of an enlarged section 112 in the pipe 98. Mounted internally of the enlarged section 112 is a can 114 having a cone-shaped tip 116 against which the entering hot mass and water impinge. Immediately upstream of conical tip 116, and rotatably mounted thereon, is a mixing impeller 118 carried by shaft 120 which extends outside of enlarged section 112 to a drive means (not shown). Appropriate packing means 121 are provided. The combined streams of water and hot ester-containing mass flow past impeller 118 into the annular area 120 intermediate the can 114 and enlarged portion 112, from which the streams enter the internal portion 122 of can 114 by a plurality of ports 124 provided circumferentially around the cylindrical section of can 114. Mounted in the internal portion 122 is a second impeller 126 which further intermixes the combined streams of water and hot ester-containing mass which have been forced through ports 124. Impeller 126 may, conveniently, be mounted on shaft 120 used to drive impeller 118.

The mixed streams of water and ester-containing mass leave the internal portion 122 of can 114 via pipe 98' and are discharged into the product scale tank 96.

Figure 5:
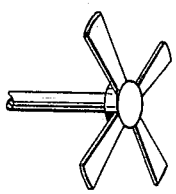

The impellers 118 and 126 may assume a variety of forms such as propellers (FIGURES 3), a disc having teeth depending therefrom (FIGURE 4) or a plurality of radically mounted flat blades (FIGURE 5).

As another suitable mixing device, a simple centrifugal pump may be employed. The water may be injected into the hot ester-containing mass immediately upstream of the pump, and the combined streams forced into the inlet of the pump. The churning action of the impeller blade is effective to mix the combined streams.

The hydroxy sulfonate esters such as described above are commonly but one ingredient of a detergent formulation designed for commercial use. Typical detergent formulations may contain, in addition, suds-boosters, builders (for home laundry detergents) binders and plasticizers (for detergent bars), colorants, pigments and the like. It has been found, as a further modification of the flash-cooling process outlined immediately above, that all of these ingredients which are non-volatile may be injected into the ester-containing mass along with the water employed for flash-cooling. As the ester-containing mass is mixed in the cooling step, the various other ingredients injected with the water are also thoroughly dispersed in the ester. The product thereby obtained may in many instances be directly blended with volatile ingredients (such as perfumes) without further substantial mixing. This variation will, therefore, introduce considerable economies in the manufacture of detergent products containing hydroxy sulfonate esters as one of the ingredients thereof.

As is well known esterification reactions, as well as hydrolysis reactions, are conventionally effectively catalyzed by providing for an alkaline medium. For this reason, it is particularly surprising that the flash-cooling step, according to the present invention, can be carried out in combination with the simultaneous injection of other ingredients of a typical detergent bar. Among the other ingredients are included the common alkali metal soaps. Because of the high alkalinity of the added soaps, it would be expected that the unwanted hydrolysis reactions would be further catalyzed while the mass remains at a reaction temperature.

For a further understanding of this invention, reference may be had to the following examples.

Example 1 sets forth in further detail the process of manufacturing the hydroxy sulfonate esters to which the present invention is applicable, while Examples 2 and 3 present further details concerning the practice of the present invention.

Example 1

2965 lbs. of coconut fatty acids and 838 lbs. of fatty acids recovered in the stripping step of a previously prepared batch of fatty acid isethionate were combined in scale tank 10. A slurry containing approximately 75% by weight of sodium isethionate, the slurry containing 2027 lbs. of sodium isethionate on a 100% pure basis were charged into stock tank 12. Finally, 8 lbs. of zinc oxide were prepared as a slurry in tank 14.

All of the foregoing ingredients were charged into the reactor and heated therein to a temperature of about 450° F. by circulating the contents of tank 16 through heat exchanger 26 via pump 28.

When the temperature of the reaction mixture reached about 380°–400° F., water evolved by the reaction together with steam distilled fatty acids began to distill from the reactor. These vapors were condensed in condenser 40. The fatty acids and water condensate were collected in separator 48 in which separator the fatty acids were decanted via pipe 50 and accumulated in tank 52.

The fatty acids in tank 52 were continuously recycled to the reactor 16 by means of a proportioning pump in line 54 which was automatically controlled to maintain a constant level of fatty acids in the collecting tank 52.

The reaction was essentially complete in approximately 150 minutes at 450°–460° F., and both fatty acids and water ceased to accumulate in the separator 48.

At this point, the reaction mixture was drained in the stripper 60 which was also purged with nitrogen to maintain an oxygen-free atmosphere. By circulating a heat transfer liquid through the jacket of stripper 60 the temperature of the reaction mixture was maintained between about 430° and 460° F.

A vacuum was applied by means of ejectors 66 and 68 to obtain a vacuum of about 20 inches of mercury. After maintaining this vacuum for a period of about 15 minutes, 963 lbs. of molten stearic acid from tank 62 was charged into stripper 60 to maintain the fluidity of the reaction product therein after the initial portion of unreacted fatty acids had been removed. The removal of the unreacted fatty acids of the charged stock was completed by further increasing the vacuum to about 27½ inches of mercury and maintaining it at this level, while the mass in the stripper was maintained at 450° F., for a period of about 45 minutes. At this point, the pressure was brought back to atmospheric by shutting off the vacuum ejectors and introducing nitrogen into the stripper.

The fatty acids collected during the stripping were returned to the fatty acid charged tank for reuse in the subsequent reaction.

After analyzing the completed batch of acyl isethionate, the reaction product, weighing 5750 lbs., was discharged and cooled. The analysis showed that the acyl isethionate content was about 75.0%, corresponding to a yield of about 92% based on the isethionate charged to the reactor.

Example 2

Sodium coconut fatty acid isethionate was prepared in a pilot-plant test following generally the procedure outlined above. Following the stripping step, the acyl isethionate was pumped into a product holding vessel. As the product was pumped to the holding vessel, water was injected to cool the reaction product to a temperature of approximately 230° F. At the injection point, the acyl isethionate had a temperature of 360° F., this temperature being somewhat cooler than the stripping temperature due to disproportionate heat losses in the small scale equipment used.

Immediately following injection of the water, the combined streams of acyl isethionate and hydroxy sulfonate were mixed by forcing the combined streams through a centrifugal pump.

Analysis of the acyl isethionate before and after cooling were taken to ascertain the amount of water picked up and the extent, if any, to which hydrolysis occurred. These analyses, for three successive runs are as follows:

| Batch No. | 1 | 2 | 3 |
| --- | --- | --- | --- |
| Active (as is basis) before cooling | 64.30 | 62.01 | 60.66 |
| H₂O before cooling | (¹) | 0.14 | 0.32 |
| Active (basis solids) before cooling | 65.08 | 62.10 | 60.85 |
| Active (as is basis) after cooling | 63.99 | 61.63 | 62.28 |
| H₂O after cooling | 2.63 | 2.15 | 1.10 |
| Active (basis solids) after cooling | 65.72 | 62.98 | 62.97 |
| Percent change in active | +0.64 | +0.88 | +2.12 |

¹ Assumed 0.2% H₂O in "before" sample for calculation.

The foregoing data show that no hydrolysis occurs as a result of flash cooling the coconut isethionate with water in accordance with the present invention.

In the foregoing test, water was injected at a rate of about 1 lb. for each 15 lbs. of acyl isethionate.

Example 3

An acyl isethionate of coconut fatty acids was prepared in accordance with the procedure of Example 1. There resulted in the stripping vessel a batch containing approximately 5750 lbs. of an ester-containing mass. The mass was initially of a temperature of approximately 435° F. This mass was discharged from the stripper through a 1½ inch pipe. During the course of discharging this mass, 62 gallons of water were injected into the 1½ inch line carrying the coconut isethionate and the combined streams were mixed using the in-line mixing device shown in FIGURE 2. The cooled mass left the mixer at a temperature between about 290° and 295° F. No significant hydrolysis of the reaction product was observed.

We claim:

1. A process for cooling a mass containing an ester of the formula $RCOR'SO_3M$ wherin R is a $C_9$–$C_{15}$ hydrocarbon radical and R′ is selected from the group consisting of divalent hydrocarbon radicals containing from 2 to 4 carbon atoms and divalent aryl and alkylaryl radicals containing from 6 to 8 carbon atoms, and M is an alkali metal cation, comprising mixing with said mass while it is at a temperature between 350° and 500° F., at which said ester is liable to hydrolysis in the presence of water, an amount of water sufficient to cool said mass to a temperature between the boiling point of water and about 330° F., said amount of water being at least about 1 pound for each 50 pounds of said mass.

2. A process for cooling a mass containing an ester of the formula RCOOR'SO$_3$M, wherein R is a C$_9$–C$_{15}$ hydrocarbon radical and R' is selected from the group consisting of divalent hydrocarbon radicals containing from 2 to 4 carbon atoms and divalent aryl and alkylaryl radicals containing from 6 to 8 carbon atoms and M is an alkali metal cation, said mass being present in a closed vessel and under an inert atmosphere, the steps of discharging said mass from said closed vessel while it is at a temperature between about 350° and 500° F., at which said ester is liable to hydrolysis in the presence of water, and injecting into said mass as it is discharged from said vessel sufficient water to cool said mass to a temperature between the boiling point of water and about 330° F., the amount of said water being at least about 1 pound for each 50 pounds of said mass.

3. A process according to claim 2, wherein said mass contains at least about 25% by weight of said hydroxy sulfonate ester.

4. A process according to claim 2, wherein said hydroxy sulfonate ester is the ester of sodium isethionate.

5. A process according to claim 2, wherein said water and said mass are intermixed with each other after the water is injected into said mass.

6. A process according to claim 2, wherein the amount of said water is sufficient to cool said mass to a temperature of below about 300° F.

References Cited

UNITED STATES PATENTS

| | | | |
|---|---|---|---|
| 2,594,171 | 4/1952 | Howell | 23—209.6 |
| 2,923,724 | 2/1960 | Anderson et al. | 260—400 |

ALEX MAZEL, *Primary Examiner.*

J. H. TURNIPSEED, *Assistant Examiner.*

U.S. Cl. X.R.

62—64, 98; 252—161; 260—400